United States Patent
Arar

(10) Patent No.: US 8,973,373 B2
(45) Date of Patent: Mar. 10, 2015

(54) ACTIVE CLEARANCE CONTROL SYSTEM AND METHOD FOR GAS TURBINE

(75) Inventor: Malath Ibrahim Arar, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 719 days.

(21) Appl. No.: 13/285,209

(22) Filed: Oct. 31, 2011

(65) Prior Publication Data
US 2013/0104564 A1    May 2, 2013

(51) Int. Cl.
F02C 6/04    (2006.01)
F02C 9/18    (2006.01)
F01D 11/24   (2006.01)
F02C 6/08    (2006.01)
F02C 7/18    (2006.01)

(52) U.S. Cl.
CPC . F02C 9/18 (2013.01); F01D 11/24 (2013.01); F02C 6/08 (2013.01); F02C 7/185 (2013.01)
USPC ................................. 60/785; 60/782; 60/806

(58) Field of Classification Search
CPC ............... F02C 6/08; F02C 9/18; F02C 7/18; F02C 7/185
USPC ................. 60/782, 785, 795, 806
See application file for complete search history.

(56) References Cited

U.S. PATENT DOCUMENTS

| | | | |
|---|---|---|---|
| 4,338,061 A | 7/1982 | Beitler et al. | |
| 5,351,473 A | 10/1994 | Shuba | |
| 5,685,693 A | 11/1997 | Sexton et al. | |
| 6,422,807 B1 | 7/2002 | Leach et al. | |
| 6,435,823 B1 | 8/2002 | Schroder | |
| 6,487,863 B1 * | 12/2002 | Chen et al. | 60/782 |
| 6,550,253 B2 * | 4/2003 | Mortzheim et al. | 60/782 |
| 6,588,197 B2 * | 7/2003 | Tanaka et al. | 60/39.182 |
| 6,925,814 B2 * | 8/2005 | Wilson et al. | 60/785 |
| 7,125,223 B2 | 10/2006 | Turnquist et al. | |
| 7,165,937 B2 | 1/2007 | Dong et al. | |
| 7,195,446 B2 | 3/2007 | Seda et al. | |
| 7,210,899 B2 | 5/2007 | Wilson, Jr. | |
| 7,232,258 B2 | 6/2007 | Garcia | |
| 7,255,929 B2 | 8/2007 | Turnquist et al. | |
| 7,287,955 B2 | 10/2007 | Amiot et al. | |
| 7,293,953 B2 | 11/2007 | Leach et al. | |
| 7,426,090 B2 | 9/2008 | Yamashita et al. | |
| 7,483,234 B2 | 1/2009 | Shimozato | |
| 7,492,543 B2 | 2/2009 | Mitsunaga et al. | |
| 7,588,413 B2 | 9/2009 | Lee et al. | |
| 7,628,585 B2 | 12/2009 | Lee et al. | |
| 7,654,791 B2 | 2/2010 | Werner | |
| 7,695,241 B2 | 4/2010 | Lee et al. | |
| 7,712,588 B2 | 5/2010 | Caron | |
| 7,719,785 B2 | 5/2010 | Taniguchi et al. | |

(Continued)

*Primary Examiner* — William H Rodriguez
(74) *Attorney, Agent, or Firm* — Nixon & Vanderhye P.C.

(57) ABSTRACT

A method to provide clearance control for a gas turbine having a multi-stage compressor and a turbine having turbine buckets rotating within a turbine shell, the method includes: selecting a first compressor stage from which to extract compressed air; ducting the compressed air from the first compressor stage to the turbine shell; passing the compressed air from the first compressor stage to thermally contract the turbine shell; selecting a second compressor stage from which to extract compressed air and deselecting the first compressor stage; ducting the compressed air from the second compressor stage to the turbine shell, and passing the compressed air from the second compressor stage to thermal expand the turbine shell.

17 Claims, 3 Drawing Sheets

(56) References Cited

U.S. PATENT DOCUMENTS

| | | | |
|---|---|---|---|
| 7,736,123 B2 | 6/2010 | Lee et al. | |
| 7,819,623 B2 * | 10/2010 | Sutherland et al. | 415/116 |
| 7,852,092 B2 | 12/2010 | Andarawis et al. | |
| 8,240,153 B2 * | 8/2012 | Childers et al. | 60/782 |
| 8,342,798 B2 * | 1/2013 | Floyd et al. | 415/116 |
| 8,413,451 B2 * | 4/2013 | Senior | 60/785 |
| 8,602,724 B2 * | 12/2013 | Takahashi et al. | 415/145 |
| 2005/0050901 A1 * | 3/2005 | Little | 60/785 |
| 2005/0109016 A1 * | 5/2005 | Ullyott | 60/282 |
| 2008/0069683 A1 * | 3/2008 | Nigmatulin et al. | 415/1 |
| 2009/0317242 A1 * | 12/2009 | Down et al. | 415/176 |
| 2010/0011779 A1 * | 1/2010 | Senior | 60/785 |
| 2011/0027068 A1 * | 2/2011 | Floyd et al. | 415/13 |
| 2011/0135456 A1 * | 6/2011 | Takahashi et al. | 415/180 |
| 2011/0138818 A1 * | 6/2011 | Mizukami et al. | 60/778 |
| 2013/0294883 A1 * | 11/2013 | Ballard et al. | 415/1 |
| 2013/0315716 A1 * | 11/2013 | Cotroneo | 415/130 |
| 2014/0157791 A1 * | 6/2014 | Saha et al. | 60/785 |

* cited by examiner

ACTIVE CLEARANCE CONTROL SYSTEM AND METHOD FOR GAS TURBINE

BACKGROUND OF THE INVENTION

The present invention relates to a gas turbine having an active clearance control system to ensure rotating blades do not rub against their seals in the stationary casing of the gas turbine.

In a gas turbine, combustion gases flow through an annular gas passage between a casing for the turbine and a rotor. Rotating blades, e.g., buckets, extend radially out from the rotor and into the annular gas passage. The hot combustion gases flowing over the blades rotate the turbine and thereby drive the gas turbine.

To maximize the conversion of energy from the hot combustion gasses to mechanical energy, it is desired to have all of the combustion gases flow through the blades of the turbine and avoid leakage of the combustion gases into the casing of the turbine or through gaps between the tips of the turbine blades and the inner surfaces of the turbine casing. The casings may include annular seal surfaces that extend around the tips of the turbine buckets. Minimizing the gap between the annular seal surfaces and the tips of the blades reduces the leakage of combustion gases and increases the thermodynamic efficiency of the gas turbine.

Because the gap is small between the seals in the casings and the tips of the blades, there is a risk that the tips of the blades will impact, e.g., rub, against the seals. This risk of rubbing is increased as the gas turbine is heated during startup and cools during shutdown. The thermal expansion rates of the casing and seals tend to be different than the thermal expansion rates of the turbine rotor, which includes the blades. The differential in the thermal expansion between the casing and the rotor causes variations in the clearance between the tips of the blades and the seals, as the gas turbine transitions during startup, shutdown and other load changes. If the clearance becomes too small, the blade tips may impact, e.g., rub, against the seals of the casing. Rubs can damage the gas turbines, such as by breaking or otherwise damaging the blades and seals. Accordingly, there is a long felt need for improved methods and apparatuses to actively control the blade tip clearances in a gas turbine.

BRIEF DESCRIPTION OF THE INVENTION

A clearance control system has been conceived for a gas turbine having a multi-stage compressor and a turbine, the system includes: a first compressed gas passage coupled to extract compressed gas from a stage of the compressor; a second compressed gas passage coupled to extract compressed gas from another stage of the compressor; a valve assembly regulating the flow of the compressed gas through the first and second compressed gas passages, wherein the valve assembly is actuated to selectively pass extracted compressed gas from a selected one of the first and second gas passages, and a third compress gas passage transporting the extracted compressed gas from the valve to a casing of the turbine.

The stage coupled to the first compressed gas passage may be a last stage of the compressor. A heat exchanger may be coupled to at least one of the first and second compressed gas passages, wherein the heat exchanger adds heat energy to the compressed gas.

A controller may be included in the clearance control system, wherein the controller receives data from the gas turbine regarding an operational mode of the gas turbine and based on the operational mode the controller actuates the valve to direct gas from one of the compressed gas passages through the valve.

A method has been conceived to provide clearance control for a gas turbine having a multi-stage compressor and a turbine having turbine buckets rotating within a turbine shell, the method includes: selecting a first compressor stage from which to extract compressed air; ducting the compressed air from the first compressor stage to the turbine shell; passing the compressed air from the first compressor stage to thermally contract the turbine shell; selecting a second compressor stage from which to extract compressed air and deselecting the first compressor stage; ducting the compressed air from the second compressor stage to the turbine shell, and passing the compressed air from the second compressor stage to thermal expand the turbine shell.

A method has been conceived to provide clearance control for a gas turbine having a multi-stage compressor and a turbine having turbine buckets rotating within a turbine shell, the method comprising: during a startup or shutdown mode of the gas turbine, selecting a first compressor stage from which to extract compressed air, ducting the compressed air from the first compressor stage to the turbine shell, and passing the compressed air from the first compressor stage to thermally expand the turbine shell; during a load or a base load mode of the gas turbine, selecting a first compressor stage from which to extract compressed air, selecting a second compressor stage from which to extract compressed air and deselecting the first compressor stage, ducting the compressed air from the second compressor stage to the turbine shell, and passing the compressed air from the second compressor stage to thermally contract the turbine shell, and performing the selection of the first compressor stage or the second compressor stage by actuating a valve assembly.

DETAILED DESCRIPTION OF THE INVENTION

Figure 1:
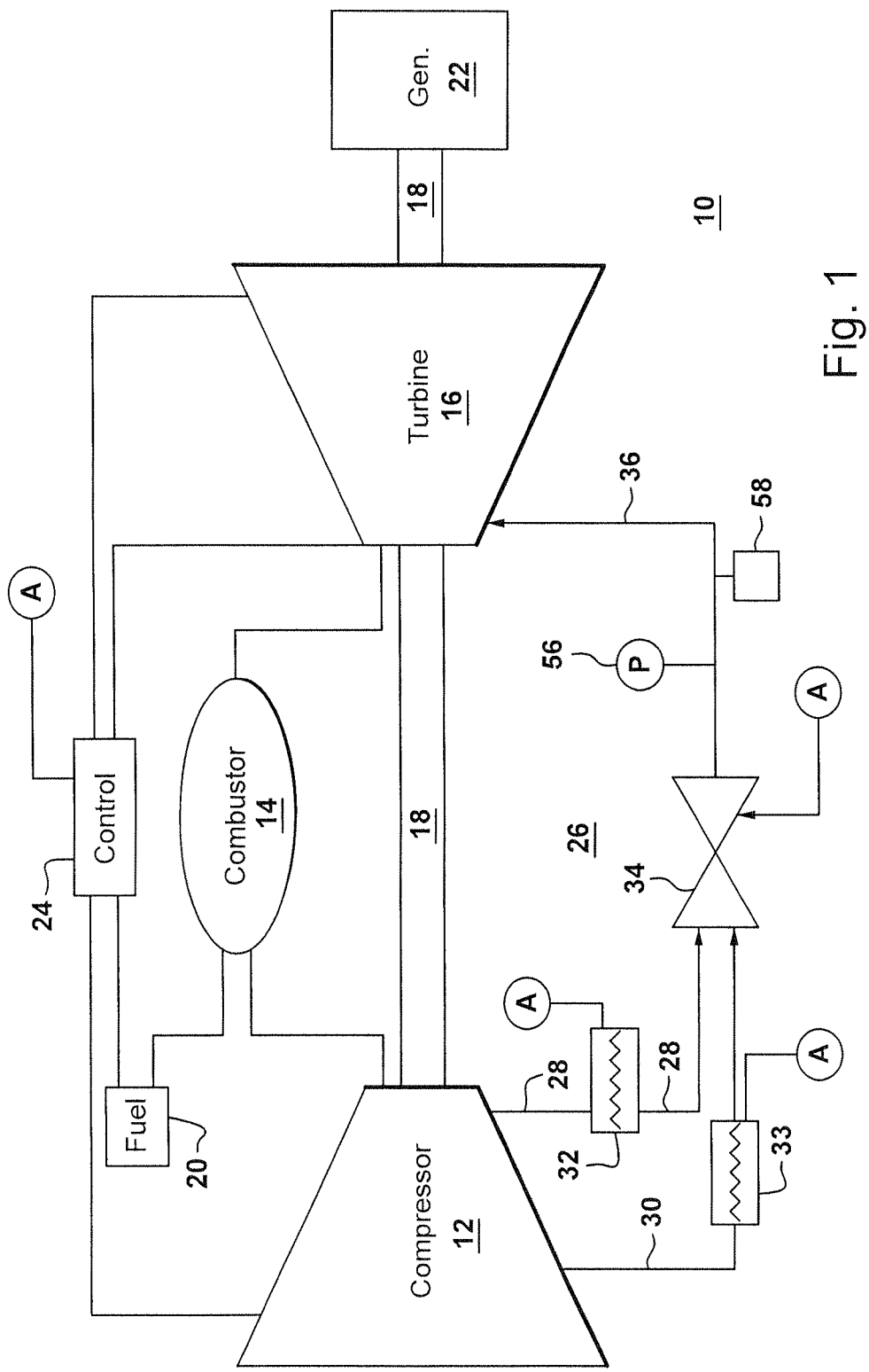
FIG. 1 is a schematic of a gas turbine having an active clearance control system.

FIG. 1 shows a gas turbine 10 having a compressor 12, a combustor 14 and a turbine 16. A rotating shaft 18 connects the turbine to the compressor. Atmospheric enters the compressor and is discharged as pressurized air entering the combustor where the air is mixed with fuel 20 and burned. The hot, pressurized combustion gases flow from the combustor through and rotates the turbine. The rotation of the turbine turns the shaft and compressor.

An electrical power generator 22 or other load is attached to and driven by the shaft. A control system may regulate the fuel entering the combustor, sets guide vanes at the intake of the compressor based on the operational condition of the gas turbine, such as power output, shaft rotational speed and turbine exhaust temperature.

An active clearance control system 26 is used to heat the casing for the turbine to ensure that the thermal expansion of the rotor does not result in the tips of the rotating blades of the turbine to rub against the stationary seals in the casing of the turbine. The active clearance control system 26 may include gas passages, a valve(s) and a heat exchanger to direct warm compressed air extracted from the compressor 12 to the casing for the turbine 16.

The active clearance control system 26 may have gas passages 28, 30 which extract compressed air from two or more stages of the compressor 12, which may be an axial compressor with successive compression stages. Each stage comprising an annular row of stators fixed to the compressor casing and an annular row of compressor blades fixed to a compressor disc and the shaft 18. For example, a passage 28 may extract hot, highly compressed air being discharged from the last stage of the compressor. Another gas passage 30 may extract warmed, less compressed air from an upstream stage of the compressor, such as the middle compressor stage or a stage between the inlet to the compressor and the middle compressor stage. The extracted warmed, less compressed air flowing through passage 30 is at a lower pressure and temperature than is the hot, highly compressed air flowing through passage 28.

The number of passages 28, 30 used by the clearance control system to extract compressed air and the locations on the compressor, e.g., corresponding to which compressor stage, at which each passage extracts compressed air may be selected based on the design of the clearance control system and the temperature requirements for the air to be used to heat or cool the turbine casing. The compressed air flowing through passage 28 will be significantly hotter than the air in passage 30, because the compressed air at the last compressor stage is much hotter than the compressed air in an upstream compressor stage.

The temperature of the compressed air flowing through one or more the passages may be adjusted, e.g., cooled or heated, by a heat exchanger 32, 33 associated with each of the passages. For example, a heat exchanger 32 in the passage 28 for hot, highly compressed air may be used to cool the compressed gas temperature to a desired temperature suitable for heating or cooling the casing of the turbine 16. A portion of hot exhaust gas from the turbine may flow through the heat exchanger 32 and used as a source of heat energy to heat the compressed gas flowing through the heat exchanger. The controller 24 may send a control signal (A) to the heat exchanger to adjust the flow of the heating/cooling fluid and thereby adjust the temperature change of the compressed gas flowing from the compressor and through the heat exchanger.

The clearance control system 26 may include a valve 34 to direct the compressed air extracted from the compressor to the turbine casing through a gas passage 36. The valve may be a one way or two-way control valve that is mounted directly to the casing of the gas turbine or positioned in close proximity to the gas turbine. The valve may be a single valve or an array of valves. The control valve 34 or valve assembly is connected to the outlets to each of the extracted compressed air passages 28, 30, and to the inlet to the gas passage 36 between the valve and turbine casing.

The valve 34 may be controlled (A) by the controller 24 to regulate the flow of the compressed air flowing to the turbine casing. For example, the valve 34 may be set to allow only compressed air from one of the compressed air passages 28, 30 to pass through the valve and to the casing of the turbine. The controller may select which passage 28 or 30 to provide the air for the turbine casing by selecting the supply of compressed air having a temperature closest to the desired temperature of the turbine casing. The valve may also be configured to combine compressed gases from two or more of the passages 28, 30 from the compressor to form a compressed gas having a desired temperature to be used to heat the turbine casing.

The controller 24 may include a computer or processor, and electronic memory to store data regarding conditions of the gas turbine, such as turbine casing proximity probes and gas temperature, and executable programs having algorithms and instructions for controlling the clearance control system and particularly the valve 34 and heat exchanger 32. The controller may receive data inputs from various sensors associated with the gas turbine, such as temperature and proximity probe sensors monitoring the turbine casing, exhaust gas and ambient air temperature, the rotational speed of the shaft, and fuel flow to the combustor. The data inputs may be used by the controller in executing the stored algorithms and instructions to automatically perform some or all of the processes described below related to clearance control.

The controller may control the valve 34 based on data from a variety of sources including: ambient air conditions, such as measured at the compressor inlet, the load applied by the generator to the gas turbine, the rotational speed of the shaft 18, and the gas discharge pressure from the compressor and at the inlet to the combustor. Based on the data, the controller may adjust the valve to provide a selected flow rate of compressed gas through passage 36 and a selected gas temperature of the gas through passage 36. By adjusting the valve 34 and selecting whether to actuate the heat exchangers 32, 33, the controller can cause compressed air to be extracted from the compressor stage having air at a temperature nearest the desired temperature of the gas to flow through the turbine casing. For example, hot compressed gas from the last stage of the compressor may be ducted through the turbine casing to cause the turbine casing to expand. Similarly, cooler compressed gas may be extracted from an earlier stage of the compressor to cause the turbine casing to shrink.

The compressed gases flowing through the turbine casing for clearance control may be exhausted from the turbine into the exhaust gas stream of the turbine.

Figure 2:
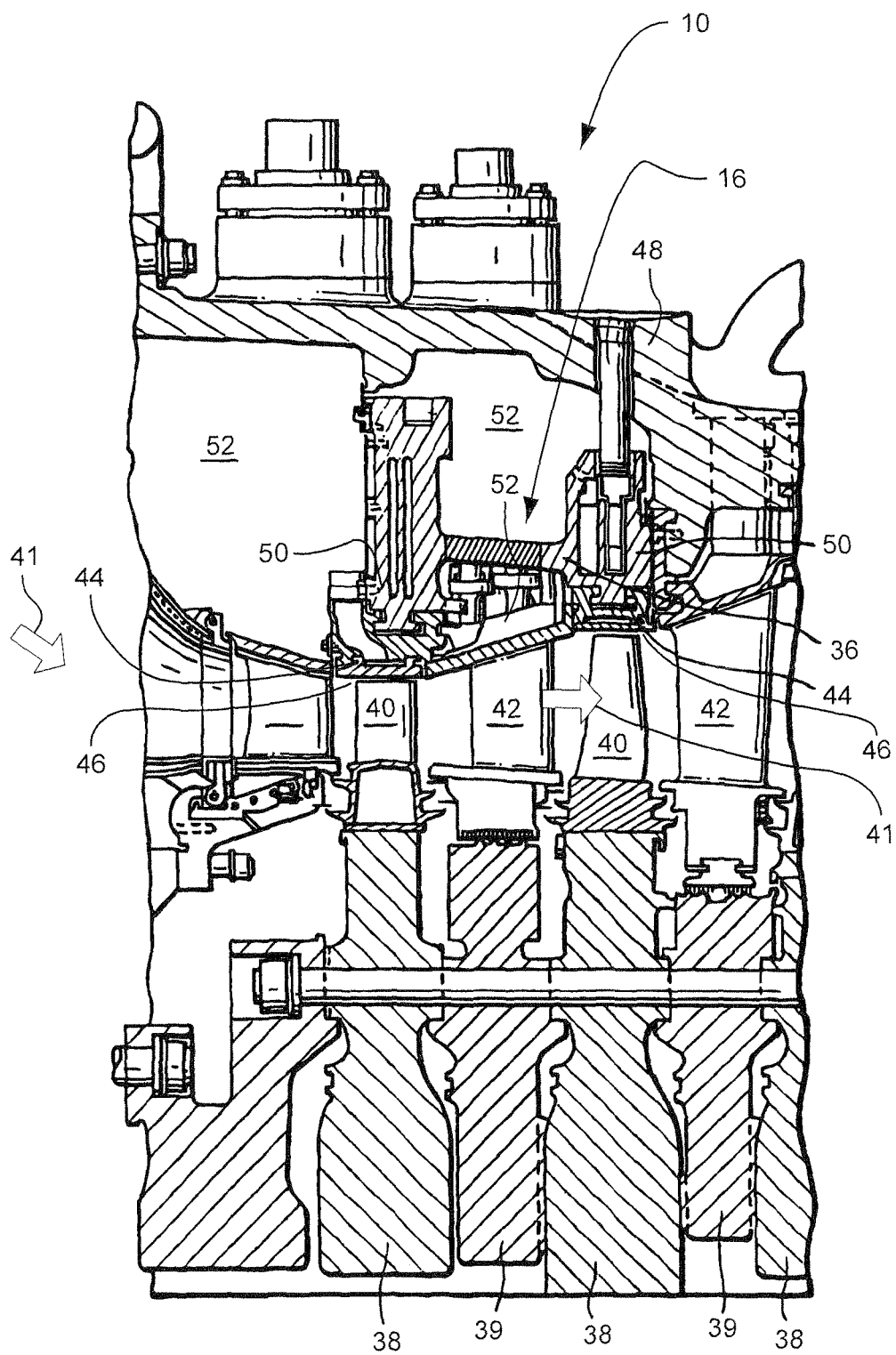
FIG. 2 is a cross-sectional view of a portion of a conventional gas turbine.

FIG. 2 is a cross-sectional view of a portion of a conventional gas turbine 10. The rotor of the turbine 16 includes a series of rotating turbine wheels 38 each carrying an annular array of turbine buckets 40. Spacers or discs 39 are sandwiched between the wheels. Stationary nozzles (vanes) 42 are arranged in circumferential arrays between the turbine wheels. The nozzles 42 and buckets 40 are in an annular flow path of combustion gases 41 from the combustor and passing through the turbine. Annular shrouds 44, e.g., annular seals, are arranged around the tips of each the buckets 28. The shrouds prevent hot combustion gases from flow radially outward of the tips of the turbine buckets.

An annular gap 46 between the inner annular surface of each shroud 44 and the tip of each bucket 40 provides a clearance between the tips and the turbine casing. The gap 46 tends to be small to minimize leakage of combustion gases through the gap but must be sufficiently large to avoid rubbing between the turbine bucket tips and the shrouds.

The gas turbine casing includes an outer structural containment shell 48 and an inner shell 50. The outer shell and inner shell may be conventional and formed in semi-circular sections joined along a horizontal mid-line. The inner shell 50 may expand and contract radially relative to the rotor for adjusting the gap 46 between the shrouds 44 and the tips of the turbine buckets 40. Ducting the extracted compressor gas through passages 52 in the inner shell and optionally between the outer and inner turbine shells is used to expand and contract the inner shell 50 in a controlled manner to adjust the gap.

During turbine startup, heated air may be supplied for circulation in the various passages 52 of the inner shell halves to radially expand the inner shell and hence displace the shrouds radially further outwardly than the tips of the buckets. The inner shell 50 may be heated faster than the turbine rotor to thermally expand the inner shell and thereby expand the gap 46 sufficiently to ensure an adequate clearance between the shrouds and the bucket tips during startup. During steady-state operation of the gas turbine, the temperature of the air supplied to the passage 52 of the inner shell can be adjusted to contract or expand the inner shell relative to the bucket tips to adjust the gap and thereby achieve a minimum clearance between the shrouds and bucket tips to increase the efficiency of the turbine operation. During turbine shutdown, the rate of thermal contraction of the inner shell 50 may be controlled to be less than the rate of contraction of the rotor and buckets.

Figure 3:
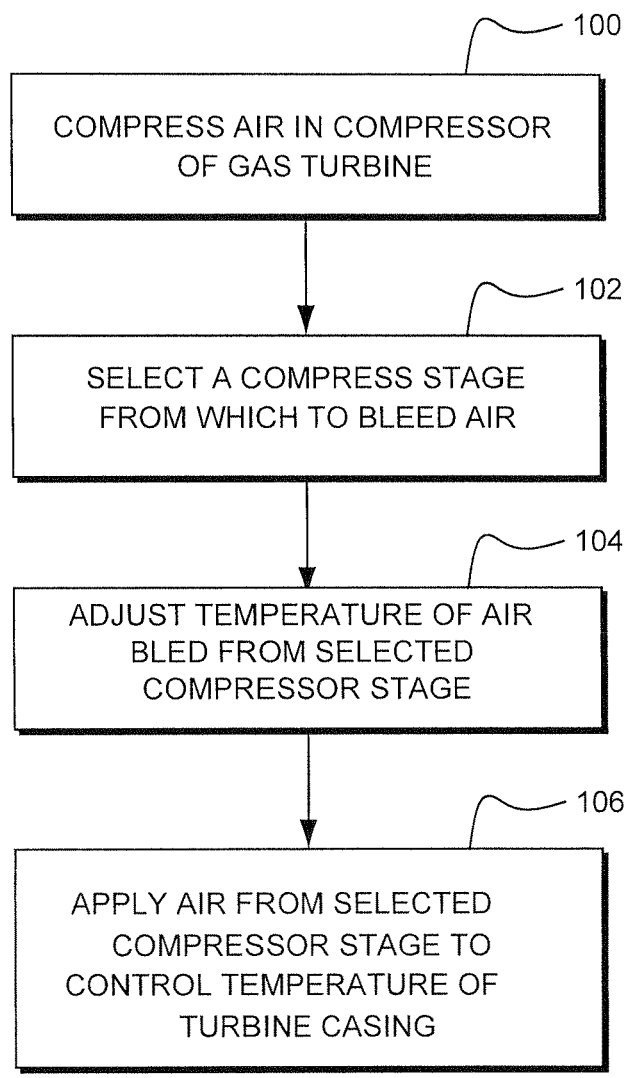
FIG. 3 is a flow chart of an exemplary process to apply compressed air extracted from two or more stages of a compressor, to heat or cool the air through a heat exchanger and apply the temperature controlled compressed air to the casing of a turbine or compressor to heat or cool the casing and thereby provide active clearance control.

FIG. 3 is a flow chart of an exemplary generic clearance control process for a gas turbine. The processes may depend on the operational condition of the gas turbine. For example, the clearance control process during a start-up phase of the gas turbine may differ from the clearance control process during steady state operation of the gas turbine and from the clearance control process during shutdown of the gas turbine. The variation in these processes may include the amount of compressor air extracted, e.g., compressor bleed air, from one or more compressor stages, the amount of heat energy added or extracted from the extracted compressor air, and the temperature of the extracted compressor air as it flows into the turbine casing.

The working fluid, e.g., atmospheric air, is compressed in the compressor of the gas turbine, in step 100. In step 102, select one or more compressor stages from which air is to be extracted from the compressor for use clearance control in the turbine. The majority of the working fluid continues to flow through the compressor and to the combustor of the gas turbine. The controller may select one or more of the compressor stages to supply the compressed air for clearance control. The selection of the compressor stage may be performed by adjusting the valve 34 such that compressed air from the selected stage flows through the valve and into the gas passage 36 coupled to the turbine casing.

In step 104, compressed air from the selected compressor stage or stages is optionally heated or cooled in a heat exchanger 32. The control system may activate or bypass the heat exchangers 32, 33 to regulate the temperature of the compressed gas extracted from the compressor. For example, the controller may adjust the heat exchanger to achieve a desired temperature for the compressed air flowing through the heat exchanger and to the valve 34 and to the turbine casing. The controller may also adjust the setting of the valve 34 to blend the compressor bleed air extracted from different compressor stages to achieve the desired temperature for the compressed air flowing to the turbine casing.

In step 106, apply the compressed air from the valve 34 to the passages in the turbine casing to thermally expand or contract the casing and thereby adjust the clearance, e.g., gap, between the tips of the turbine buckets and casing.

The process shown in FIG. 3 may be tailored for different operational modes of the gas turbine. For example, during turbine startup and shutdown modes, the controller may set the valve 34 such that compressed air from the last stage of the compressor flows through passages 28 and 36 and to the turbine casing. The controller may determine whether to heat the compressed air in the heat exchanger 32 based on temperature data indicating ambient air temperature. If the ambient air is below a threshold, such as twenty degrees Celsius, the controller may duct the compressed gas in passage 28 through the heat exchanger 28 to increase the heat energy in the compressed gas available to be transferred to the turbine casing. If the ambient temperature is above the threshold, the controller may cause the compressed air in passage 28 to bypass the heat exchanger and flow directly to the turbine casing.

The controller may direct the compressed air to the turbine casing to thermally expand the turbine casing to thereby increase the blade clearances and avoid initial blade rubbing. The controller may continue the flow of the compressed air to the turbine casing during the startup mode and until the gas turbine is stable and at a full speed, no load condition. During a shutdown mode, the controller may continue the flow of compressed air to the turbine until the buckets stop rotating within the turbine casing.

During loading and base load modes of gas turbine operation, the controller may execute a cooling cycle of the clearance control system to minimize the gap 46 and improve the efficiency of the gas turbine. The gas turbine may be operating at a steady rotational speed during the base load mode. While the gas turbine is in a load or base load mode, the controller may actuate the valve 34 such that compressed gas is extracted from a lower compressor stage, flows through passages 30 and 36 to the turbine casing.

The valve 34 may be set such that no compressed air is extracted into passage 28 from the last stage of the compressor while air flows from a lower compressor stage and through passage 30. Due to the differences in the pressures of the gases extracted at the different compressor stages, the valve 34 may be configured to allow gas to flow through only one passage 28, 30 at a time and to close off the other passage 30, 28 while compressed air is extracted into the first passage. Alternatively, gas pressure control devices in the passages 28 and 30 may equalize the gas pressures in these passages such that the gas pressure flowing into passage 36 is substantially uniform regardless of which compressor stage provides the gas.

The temperature of the compressed gas flowing to the turbine casing may be lower than metal temperature of the turbine casing. As the cooler compressed air circulates through the turbine casing, the casing shrinks and reduces the clearance, e.g., gap, between the shrouds of the casing and the tips of the blades. The controller may duct the compressed gas flowing in passage 30 through the heat exchanger 33 to add or remove heat energy and thereby cause the compressed air to be at a desired temperature for cooling the turbine casing. Whether to pass the compressed gas through the heat exchanger may be determined by the controller based on ambient air temperature or based on turbine casing temperature or proximity probes.

The controller may monitor the pressure in the passage 36 by receiving pressure data from a pressure sensor 56 coupled to the passage. The controller may control the valve 34 or a pressure relief device 58 to ensure that the pressure of the gases flowing through the turbine casing is at a suitable pressure level for the casing.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A clearance control system for a gas turbine having a multi-stage compressor and a turbine, the system comprising:

a first compressed gas passage coupled to extract compressed gas from a stage of the compressor;

a second compressed gas passage coupled to extract compressed gas from another stage of the compressor;

a valve assembly regulating the flow of the compressed gas through the first and second compressed gas passages, wherein the valve assembly is actuated to selectively pass extracted compressed gas from a selected one of the first and second compressed gas passages a third compressed gas passage transporting the extracted compressed gas from the valve to a casing of the turbine, and a heat exchanger coupled to at least one of the first and second compressed gas passages, wherein the heat exchanger adds heat energy to the compressed gas.

2. The clearance control system of claim 1 wherein the stage coupled to the first compressed gas passage is a last stage of the compressor.

3. The clearance control system of claim 1 wherein the heat exchanger includes a first heat exchanger in the first compressed gas passage and a second heat exchanger in the second compressed gas passage.

4. The clearance control system of claim 1 further comprising a controller, wherein the controller receives data from the gas turbine regarding an operational mode of the gas turbine and based on the operational mode the controller actuates the valve to direct gas from one of the compressed gas passages through the valve.

5. A method to provide clearance control for a gas turbine having a multi-stage compressor and a turbine having turbine buckets rotating within a turbine shell, the method comprising:

selecting a first compressor stage from which to extract compressed air;

ducting the compressed air from the first compressor stage to the turbine shell;

passing the compressed air from the first compressor stage to thermally contract the turbine shell;

selecting a second compressor stage from which to extract compressed air and deselecting the first compressor stage;

ducting the compressed air from the second compressor stage to the turbine shell, and passing the compressed air from the second compressor stage to thermally expand the turbine shell.

6. The method of claim 5 wherein the second compressor stage is a last compressor stage in the compressor and the compressed air from the last compressor stage is compressor discharge air.

7. The method of claim 5 wherein the first compressor stage is a compressor stage in a middle section of the compressor.

8. The method of claim 5 wherein the second compressor stage is selected and the first compressor stage is not selected by actuating a valve in fluid communication with the extracted compressed air.

9. The method of claim 5 further comprising adding heat energy to the compressed air after the compressed air is extracted from the compressor and before the compressed air enters the turbine shell.

10. The method of claim 9 wherein the heat energy is added based on a determination that an ambient air temperature is below a threshold temperature.

11. The method of claim 5 wherein the ducting of the compressed air from the second compressor stage to the turbine shell occurs during at least one of a startup and shutdown operational modes for the gas turbine.

12. The method of claim 5 wherein the ducting of the compressed air from the first compressor stage to the turbine shell occurs during a loading or base load operational mode of the gas turbine.

13. A method to provide clearance control for a gas turbine having a multi-stage compressor and a turbine having turbine buckets rotating within a turbine shell, the method comprising:

during a startup or shutdown mode of the gas turbine, selecting a first compressor stage from which to extract compressed air, ducting the compressed air from the first compressor stage to the turbine shell, and passing the compressed air from the first compressor stage to thermally expand the turbine shell;

during a load or a base load mode of the gas turbine, selecting a first compressor stage from which to extract compressed air, selecting a second compressor stage from which to extract compressed air and deselecting the first compressor stage, ducting the compressed air from the second compressor stage to the turbine shell, and passing the compressed air from the second compressor stage to thermally contract the turbine shell, and performing the selection of the first compressor stage or the second compressor stage by actuating a valve assembly.

14. The method of claim 13 wherein the second compressor stage is a last compressor stage in the compressor and the compressed air from the last compressor stage is compressor discharge air.

15. The method of claim 13 wherein the first compressor stage is a compressor stage in a middle section of the compressor.

16. The method of claim 13 further comprising adding heat energy to the compressed air after the compressed air is extracted from the compressor and before the compressed air enters the turbine shell.

17. The method of claim 16 wherein the heat energy is added based on a determination that an ambient air temperature is below a threshold temperature.

* * * * *